(12) United States Patent
Perretta et al.

(10) Patent No.: US 12,356,975 B2
(45) Date of Patent: Jul. 15, 2025

(54) COVER FOR FISHING LURES AND HOOKS

(71) Applicant: Outdoor Innovation LLC, Massillon, OH (US)

(72) Inventors: Mark Perretta, Massillon, OH (US); Paul Metcalfe, Solon, OH (US); Scott Urban, Solon, OH (US)

(73) Assignee: Outdoor Innovation LLC, Massilon, OH (US)

( * ) Notice: Subject to any disclaimer, the term of this patent is extended or adjusted under 35 U.S.C. 154(b) by 44 days.

(21) Appl. No.: 18/236,197

(22) Filed: Aug. 21, 2023

(65) Prior Publication Data

US 2025/0064042 A1   Feb. 27, 2025

(51) Int. Cl.
*A01K 97/06* (2006.01)
*A01K 87/00* (2006.01)

(52) U.S. Cl.
CPC .......... *A01K 97/06* (2013.01); *A01K 87/009* (2022.02)

(58) Field of Classification Search
CPC ............................. A01K 97/06; A01K 87/009
USPC ................................................. 43/25.2, 57.1
See application file for complete search history.

(56) References Cited

U.S. PATENT DOCUMENTS

| | | | | |
|---|---|---|---|---|
| 1,216,069 A * | 2/1917 | Cammack | ............. | A01K 97/06 43/25.2 |
| 2,285,888 A * | 6/1942 | Benton | ................. | A01K 97/24 43/25 |
| 2,364,807 A * | 12/1944 | Nelson, Jr. | ............. | A01K 97/06 206/315.11 |
| 2,691,840 A * | 10/1954 | Smith | .................... | A01K 97/00 43/25.2 |
| 2,767,502 A * | 10/1956 | Reynolds | ............... | A01K 97/06 43/57.1 |
| 2,841,917 A * | 7/1958 | Haskell | .................. | A01K 97/06 206/315.11 |
| 2,846,806 A * | 8/1958 | Gaines | ................... | A01K 97/06 206/315.11 |
| 2,943,414 A * | 7/1960 | Tussing | ................. | A01K 87/00 43/25.2 |

(Continued)

FOREIGN PATENT DOCUMENTS

| | | |
|---|---|---|
| CN | 212977263 U | 4/2021 |
| FR | 2481576 A1 | 11/1981 |
| KR | 564322 B1 | 3/2006 |

OTHER PUBLICATIONS

Snail Trail, Snail Trail Fishing Lure Wraps 4 Packs Fish Bait Cover Crankbait Storage Binder Rig Keeper Hook Organizer JIG Protector for Brackpack & Rod Holder Pole Sleeve Guard Gofts for Men, Amazon, 2022-09-06, Snail Trail.

(Continued)

*Primary Examiner* — Christopher D Hutchens
(74) *Attorney, Agent, or Firm* — Lippes Mathias LLP

(57) ABSTRACT

A cover for hooks of fishing lures has a body having a first half and a second half, which are connected together by a resilient biased hinge. A plurality of teeth are formed on the first half and the second half and gaps are formed between each of the teeth. The first half and the second half each have a cavity for retaining one or more hooks of a fishing lure. The first half and the second half each have a sloped end face to facilitate removal of the hook and the fishing lure from the cover. Hooks and clips are provided for securing the cover to a fishing pole.

17 Claims, 19 Drawing Sheets

(56) References Cited

U.S. PATENT DOCUMENTS

| | | | | |
|---|---|---|---|---|
| 3,026,644 | A | * | 3/1962 | Raider .................. A01K 91/02 |
| | | | | 43/19 |
| 4,006,553 | A | * | 2/1977 | Porter .................. A01K 97/06 |
| | | | | 220/555 |
| 4,033,648 | A | * | 7/1977 | Lopez-Cepero ....... A01K 97/06 |
| | | | | 312/100 |
| 4,452,003 | A | * | 6/1984 | Deutsch ................ A01K 97/06 |
| | | | | 206/315.11 |
| 5,392,557 | A | * | 2/1995 | Harmon ................ A01K 97/06 |
| | | | | 206/315.11 |
| 5,430,969 | A | | 7/1995 | Taylor et al. |
| 5,475,942 | A | * | 12/1995 | Tatum .................. A01K 97/06 |
| | | | | 43/25.2 |
| 5,502,916 | A | | 4/1996 | Krewson, Jr. |
| 5,739,252 | A | * | 4/1998 | Kirchmeyer ........... C08G 18/65 |
| | | | | 264/165 |
| 6,085,455 | A | * | 7/2000 | Bracken ................ A01K 97/08 |
| | | | | 43/25 |
| 6,584,725 | B1 | * | 7/2003 | Elam .................... A01K 97/08 |
| | | | | 43/25 |
| 6,691,448 | B2 | | 2/2004 | Jones |
| 7,168,202 | B2 | | 1/2007 | Koehler |
| 7,299,582 | B1 | | 11/2007 | Whitehead |
| 7,703,234 | B2 | | 4/2010 | Dodge |
| 9,497,951 | B1 | * | 11/2016 | Stefanko ............... A01K 97/06 |
| 2004/0250462 | A1 | | 12/2004 | Trebil |
| 2010/0083558 | A1 | * | 4/2010 | Brown .................. A01K 97/06 |
| | | | | 43/25.2 |
| 2013/0185988 | A1 | * | 7/2013 | McKenzie ............. A01K 97/06 |
| | | | | 43/25.2 |
| 2015/0327529 | A1 | | 11/2015 | Zimmerman |
| 2016/0143261 | A1 | * | 5/2016 | Oberacker ............. B65B 63/04 |
| | | | | 53/430 |
| 2022/0174927 | A1 | * | 6/2022 | Weller .................. A01K 97/06 |

OTHER PUBLICATIONS

Toadan, Toadan 12PCS Portable Squid JOG Hook Protector Fishing JIGS Lure Covers Fishing Hook Cover Fishing Hook Bonnets Squid JIG Hook Protector Case Fishing Tackle Boxes Tools, Amazon, Feb. 16, 2022, PSCCO.

* cited by examiner

COVER FOR FISHING LURES AND HOOKS

BACKGROUND OF THE DISCLOSURE

This disclosure relates to fishing lures. More particularly, it relates to a cover or clip used with fishing lures and fishing rods which can cover and protect several hooks of fishing lures, such as, but not limited to treble hooks.

A hook at the end or along the sides of the fishing lure when not in use would present safety issues. Also, some lures have several hooks which cannot be properly or easily covered.

For example, some lures may have one, two or three hooks, such as, for example, treble hooks, which need to be covered when not in use.

A cover is needed to protect and cover hooks on fishing lures in order to prevent injury and snags. The cover is preferably attached or secured to a fishing rod or pole, but is also useful in a tackle box or the like.

A problem with fish lures with hooks is that the hooks can get caught on a variety of items, such as carpet in the boat or vehicle, a person, other fishing equipment, clothing, a person's skin, etc.

Moreover, rods are difficult to transport with lures attached. There is a need for a cover which can cover all hooks of lures quickly, efficiently, easily, and conveniently.

Thus, there is a need for a fishing lure hook cover which overcomes the above-mentioned deficiencies and others while providing better overall results.

SUMMARY OF THE DISCLOSURE

The cover of the present disclosure will house the hooks of a fishing rod to keep the hooks from snagging things when the user is not fishing. Covers are typically made of lightweight, yet durable material (e.g., plastic) and are usually inexpensive. They can be made in a variety of sizes, for hooks of different sized fishing lures.

The present disclosure provides a protective housing for a fishing lure which encloses all hooks of the fish lure, but conveniently exposes the lure type and size, such as one, two or three (or more) fishing hooks attached to a line of the fishing pole to prevent the hooks from becoming entangled with other fishing pole lines, or being snagged in clothing or home, vehicle or boat upholstery and causing injuries, and which provides a separate and secure storage compartment for storing fishing lures that otherwise require another hand to carry.

A cover for hooks of fishing lures is provided which includes a body having a first half and a second half, wherein the first half and the second half are connected together by a resilient biased hinge. A plurality of teeth are formed on the first half and the second half wherein a gap is formed between each of the teeth. The first half and the second half each have a cavity for retaining one or more hooks of a fishing lure; and the first half and the second half each has a sloped end wall to facilitate egress of the hooks of the fishing lure.

Another aspect of the disclosure is to provide a cover for fishing lure hooks on a fishing rod which forms a protective housing to prevent damage to the hooks, as well as preventing the hooks from becoming entangled with other lines or from causing accidental puncture wounds.

Another aspect of the disclosure is a cover which can cover hooks quickly and efficiently, easily, in a convenient manner (such as fitting into a pocket, a shirt or hat) and in a practical manner.

Another aspect of the disclosure is the cover allows fishermen to remove lures from tangle-prone nets by covering each hook progressively as each hook is freed from a net.

Another aspect of the disclosure is to provide a protective housing for attachment to a fishing rod to cover several hooks, such as one, two or three hooks.

Another aspect of the disclosure is easy transportation or handling of multiple rods and lures already on the line to increase in hook-up ratio. Lures that are "covered" or "clipped" are easily visible to the fisherman. The compact size of the cover allows the fisherman to store the cover in multiple locations off of the fishing rod or leave the cover on the rod with the line attached to the lure.

It is a further aspect of the disclosure to provide a protective housing attachable to a fishing rod to enclose a lure and hook.

Still other aspects of the disclosure will become apparent upon a reading and understanding of the following detailed description.

DETAILED DESCRIPTION OF THE DISCLOSURE

This disclosure relates to fishing lures. More particularly, it relates to a cover for housing and protecting hooks for fishing lures.

Figure 1:
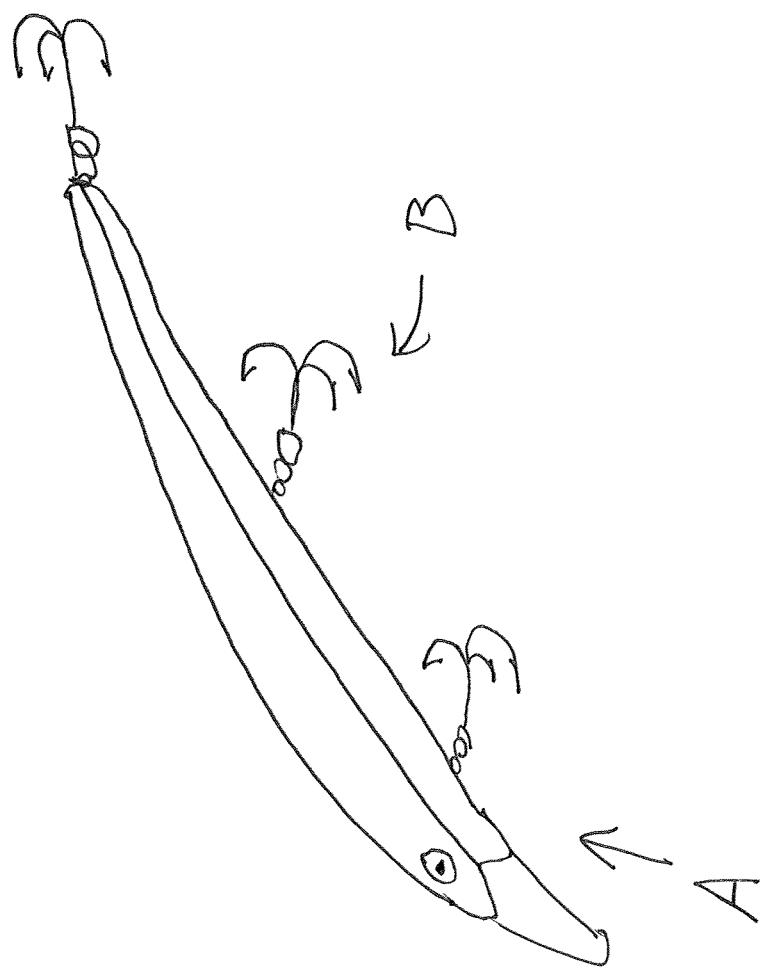
FIG. 1 is a side elevational view of an existing fishing lure with three treble hooks.
Figure 2:
FIG. 2 is a side elevational view of an existing fishing lure with two treble hooks.

Referring to FIG. 1, an existing fishing lure A is shown which has three treble hooks B. Referring to FIG. 2 an existing fishing lure C is shown which has two treble hooks D. Of course, other fishing lures with other hooks, such as, one, two, three or more hooks is contemplated by the disclosure.

Referring now to FIGS. 3 to 11, a cover 10 for fishing lure hooks in accordance with a preferred embodiment is shown. The cover preferably has a clam shell housing having a top or first member or half 12 and a bottom or second member or half 14. A resiliently biased spring hinge assembly 16 connects the two members together. Upper member 12 has a cavity 18 and lower member 14 has a cavity 19 formed therein for accommodating hooks of a fishing lure. Within the cavities are formed a plurality of teeth 20.

The cover may be fabricated of a generally rigid plastic such as 75 Shore D hardness/durometer, while softer plastics would not work as well. Softer material may allow the tips of the hooks to penetrate, impeding proper quick and easy release.

Figure 4:
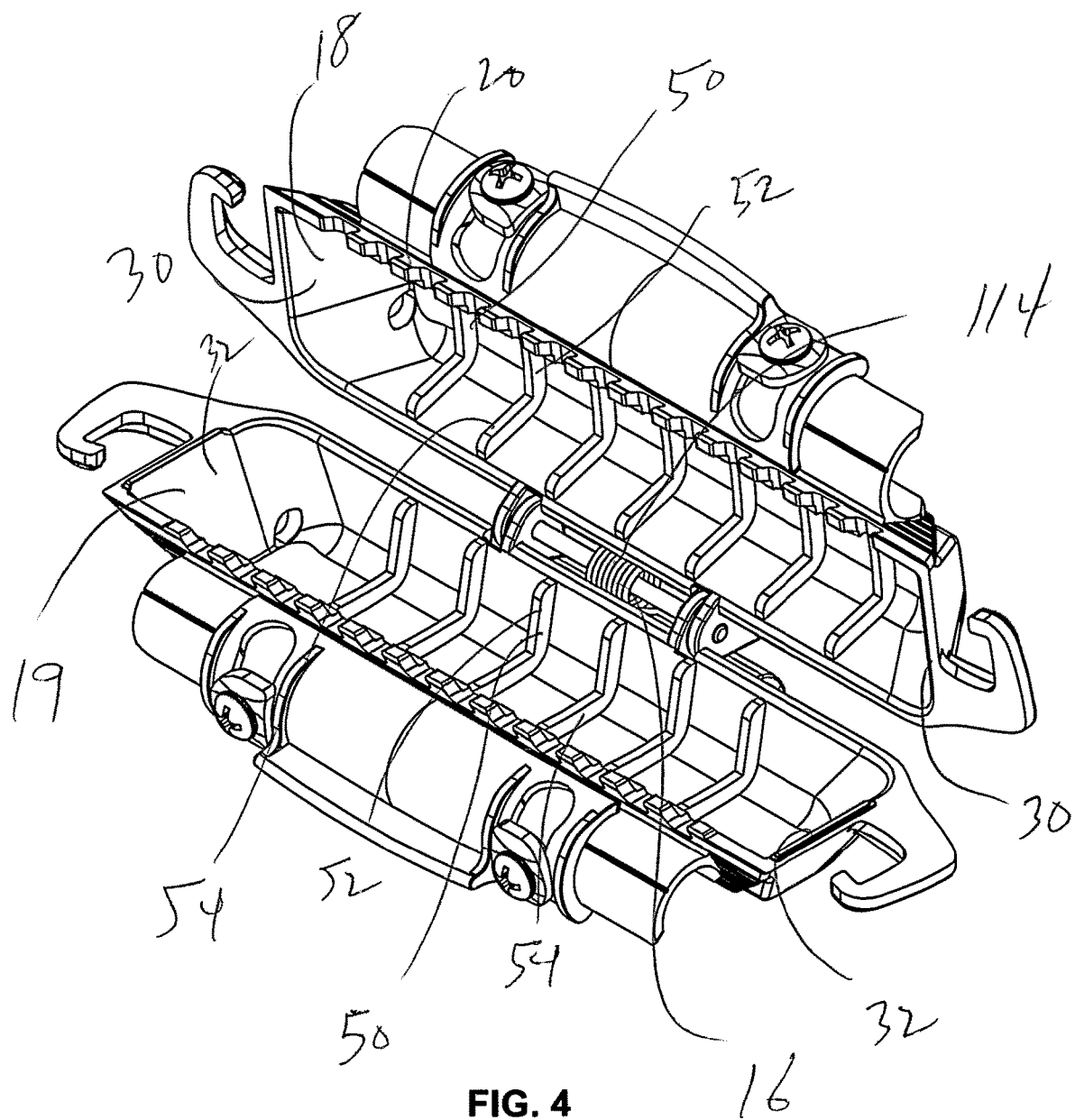
FIG. 4 is a perspective view of the cover of FIG. 3 in an opened configuration.
Figure 5:
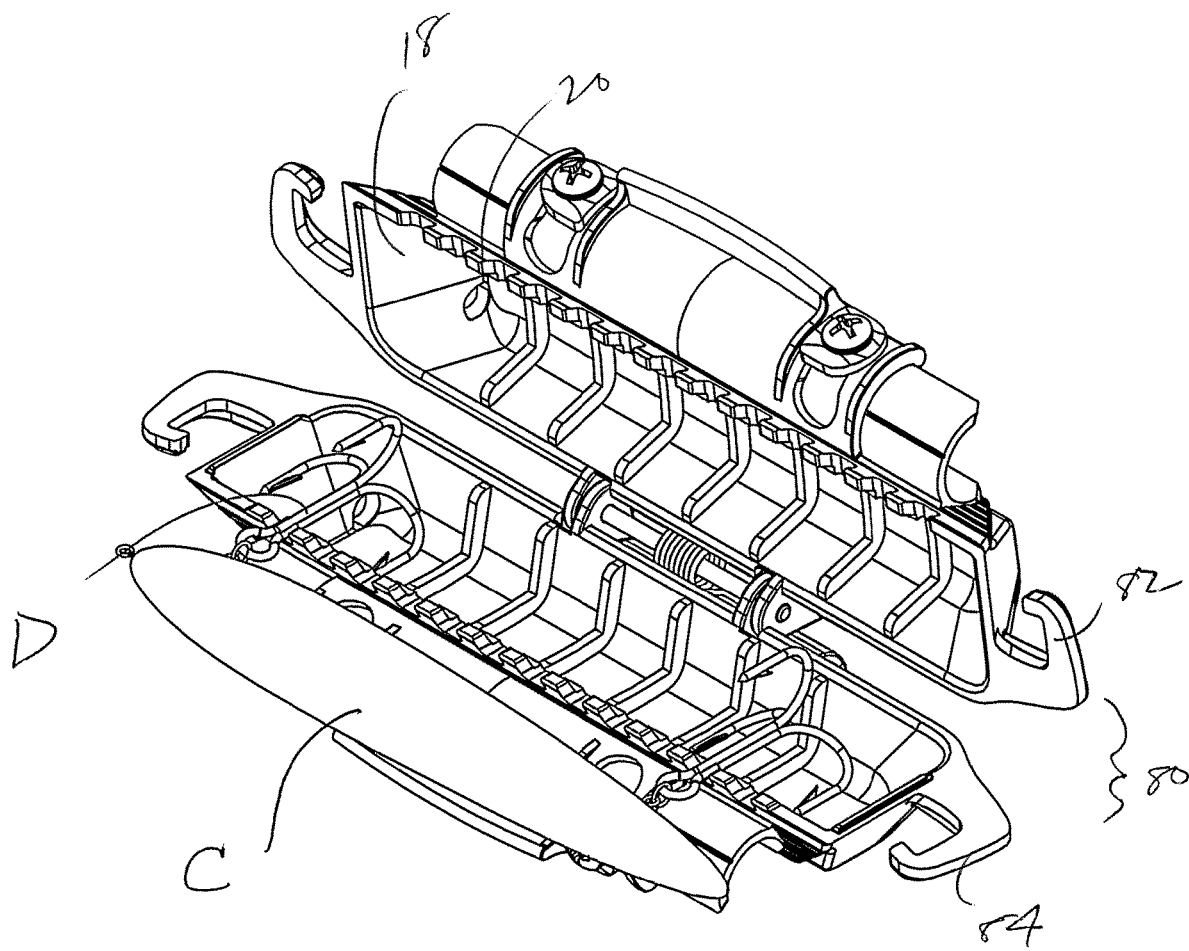
FIG. 5 is a perspective view of the cover of FIG. 3 in an opened configuration with a fishing lure with two hooks.
Figure 6:
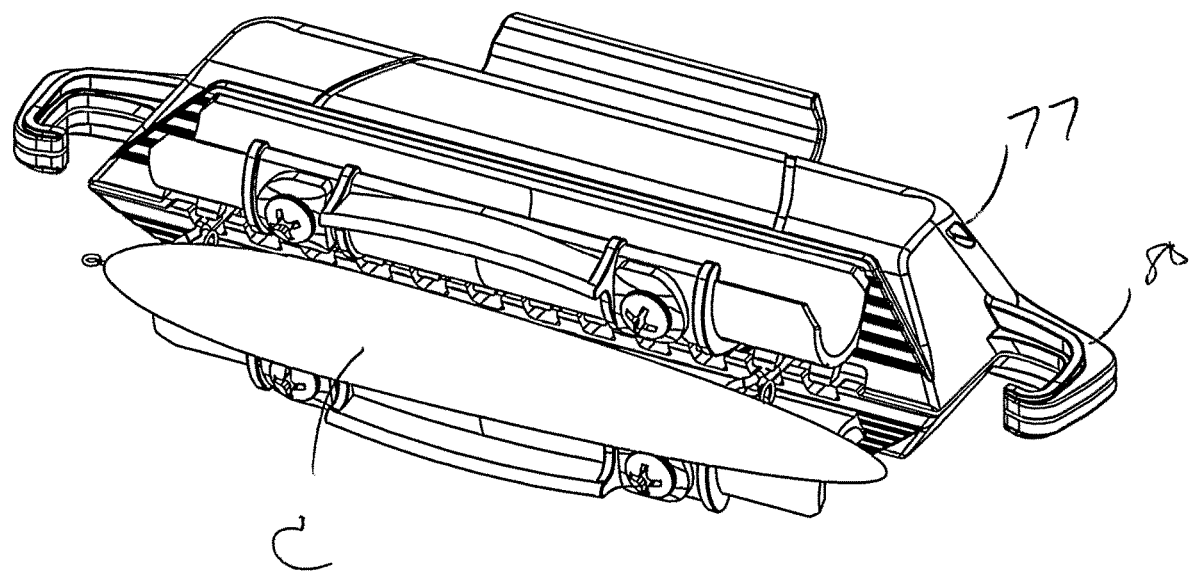
FIG. 6 is a perspective view of the cover of FIG. 5 in a closed configuration with a fishing lure with two hooks.
Figure 7:
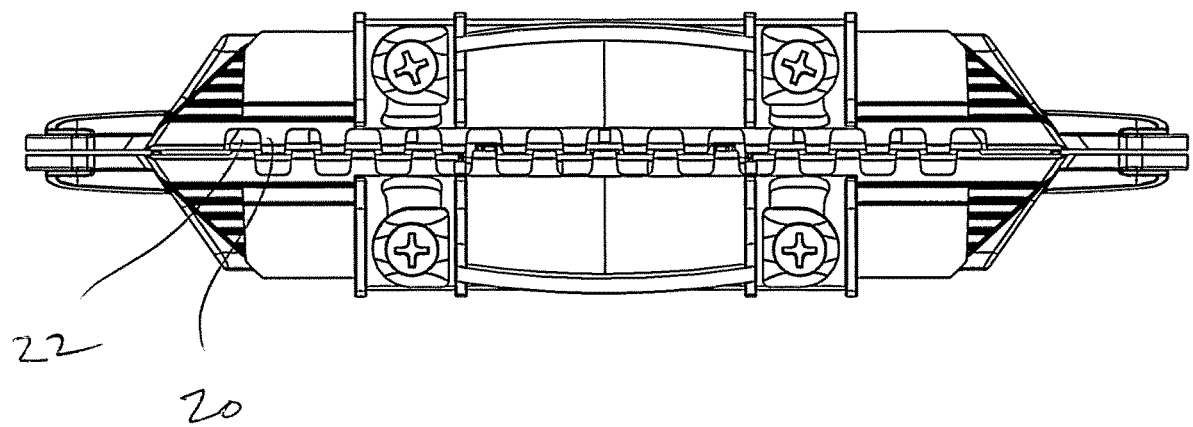
FIG. 7 is a front elevational view of the cover of FIG. 3 in a closed configuration.

Referring to FIGS. 4 and 7, the teeth 20 are preferably nearly square edged to hold the hooks in place while allowing snag free release of the hook. Large angled edges (such as 30 degrees or more) on the teeth is undesirable as it allows the hook to use the tooth edge as a ramp or wedge to pry open the cover enough to allow the lure to be pulled along its axis in the cover. Therefore, smaller than 30 degrees is desirable on the teeth edge.

In contrast, totally inverted edges of the teeth would impede the release of hooks as they can rotate and their shafts could wedge between the teeth preventing or restricting lure egress from the cover. Fully straight teeth would also occasionally allow hooks to get caught on the edges of the teeth.

A preferable angle of teeth edges is about 5 degrees, but a slightly larger angle would also be effective.

A gap 22 is formed between each tooth and is large enough to fit the entire shaft of the hook between the teeth. The gaps also serve as drain holes for the clip. Enough clearance is provided to allow the cover to fully close with the hooks inside. If there were no gap or if there were a smaller gap the cover would be prevented from closing fully when it clamped onto the hook shaft. This would leave a gap all around the edges which could allow the hook barbs or prongs to poke through the cover. Extra clearance between the teeth helps avoid the hooks from getting stuck and not releasing when the cover is opened. Teeth are not provided at the distal ends of the cover so hooks cannot be provided near the end faces of the cover. If the hooks are too close to the end faces they may stick out of the ends of the cover halves.

End faces 30, 32 of the cover are angled so that the hooks do not catch on the faces 30, 32 when the lure is being released such as when the lure is attached to the line and there is any amount of tension on the line which pulls the hook towards the end faces of the cover. The ramps of end faces allow hooks to be easily released and the line to be easily removed. Often lures are released from the cover when the cover is attached to the rod, but not necessarily have to be attached to the rod. This allows the user to store the lure on the fishing rod with tapered clips 90 while attached to the fishing line and released from the cover quickly and easily to start fishing. Releasing the lure is done by simply rotating the cover on the fishing pole about 90 degrees so it won't get tangled in the line and squeezing the tabs to open the cover. The tension in the line will pull the lure and its hooks towards an end face 30, 32 as soon as the teeth 20 are no longer holding the hooks. If the end faces 30, 32 were perpendicular to the longitudinal axis of the cover the hook would catch on the end face. The end faces 30, 32 should preferably have a tapered angle of at least 15 degrees.

Referring now to FIG. 4, internal ribs 50 are formed within the cavity 18, 19 of each cover member or half 12, 14. Short rib portions 52 are formed perpendicular to a longitudinal axis of the cover body, while longer rib portions 54 are also formed perpendicular to a longitudinal axis of the body and to the short rib portions. The ribs need to be thick enough to so that they will interfere with legs 60 of the treble hooks that are fully extended towards the top or bottom. The ribs also prevent the hooks from sliding horizontally sideways or rotating within the body. This helps keep the hooks in place when the cover is closed so the hooks cannot move around or extend out of the cover, such as allowing a barb E to extend out of the cover, which would be disconcerting and potentially harmful to the user. The ribs also provide rigid structural support for the cover body.

Figure 9:
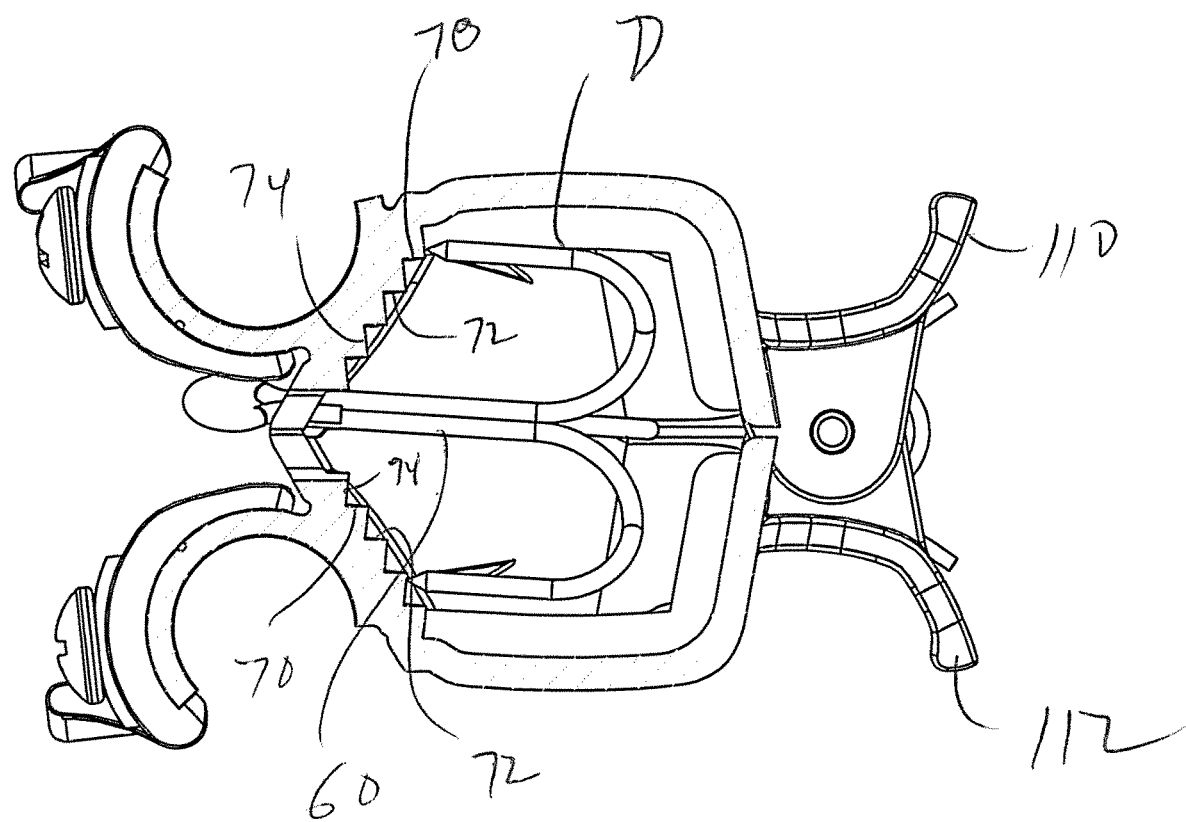
FIG. 9 is a side elevational view of the cover of FIG. 8 in cross section showing the hooks inside the cover.
Figure 18:
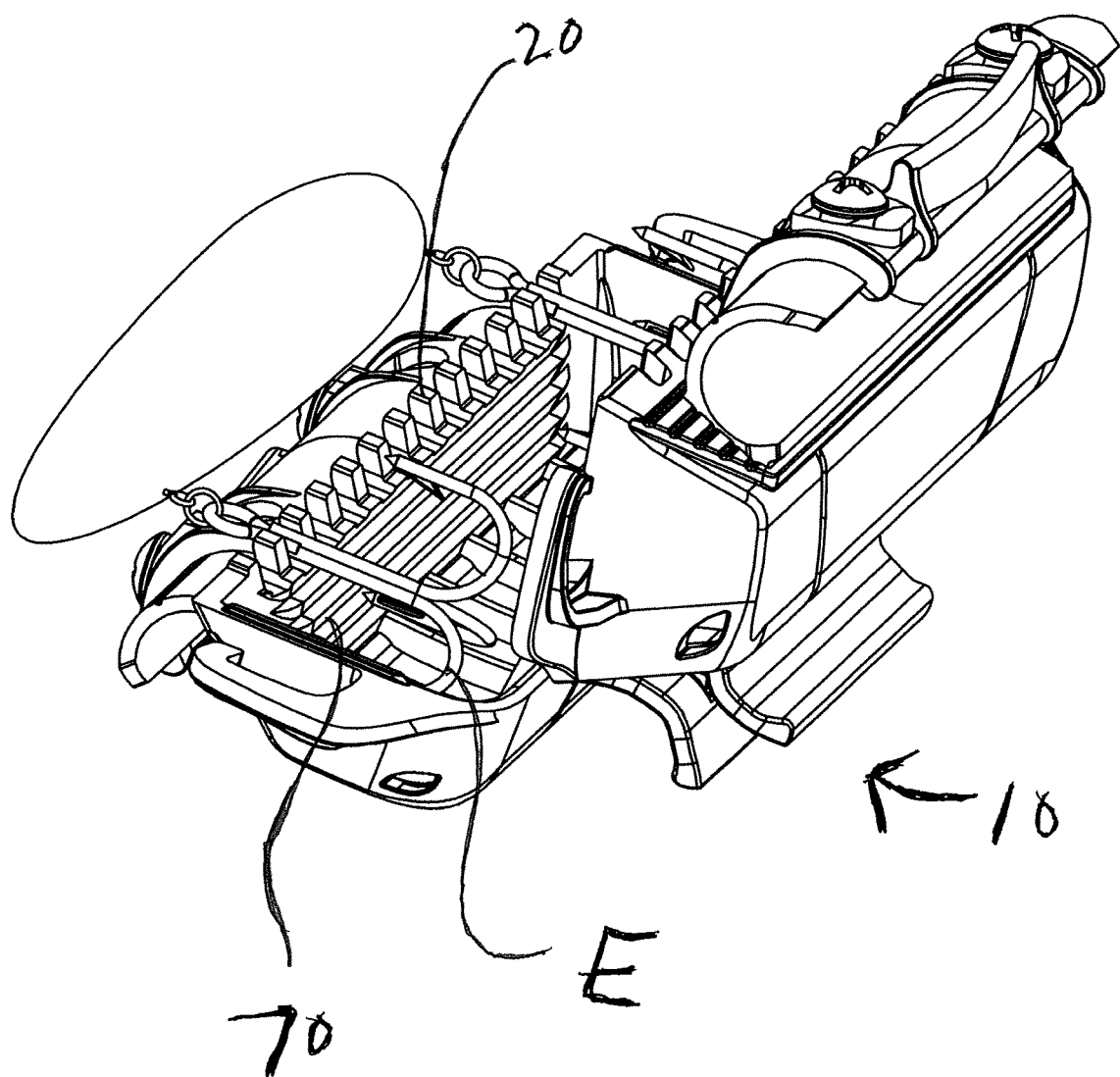
FIG. 18 is another perspective view of the cover showing the steps in the cover cavity.

Referring now to FIGS. 9 and 18, notches 70 or "reverse stair steps" are formed on inner walls of the cover within the cavities of 18, 19 of the cover. The steps each have ledges 72 and raked back faces 74 which also serve to prevent the hooks from moving vertically in or out of the cover body. The steps 70 are formed farther from the teeth 20 laterally as well as vertically meaning that the steps are positioned for different size hooks (i.e. a hook that is longer is also usually wider which in this orientation will extend vertically. The steps result in the hooks staying in place once the cover is closed.

The steps also make it harder for the hooks to inadvertently fall out of the cover when it is opened, which could otherwise happen faster or easier than expected and result in dropped, lost or lures stuck undesirably to clothing, people or other objects.

The steps 70 are not positioned near or adjacent each end face 30, 32 to prevent hooks from getting caught and not releasing when there is tension on the line (the same scenario as for the angled end faces). Otherwise, the hook would get caught in the corner such as of a raked back end face.

Figure 19:
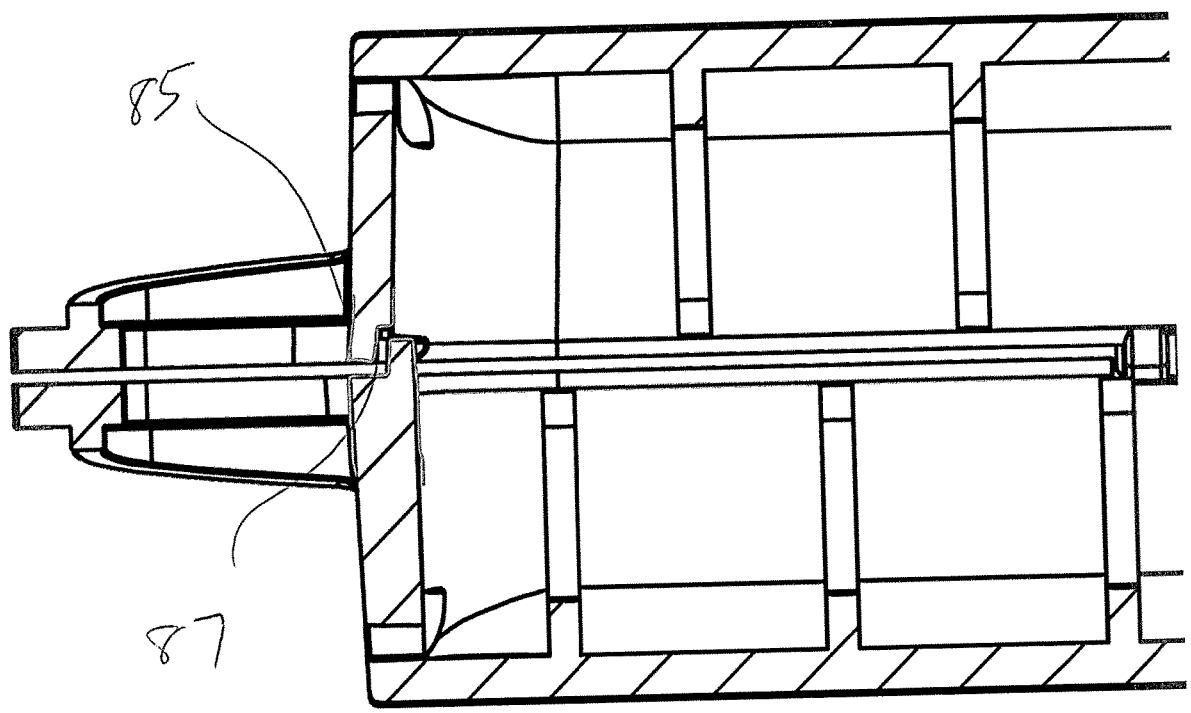
FIG. 19 is a side elevational view in cross-section showing a lip and groove arrangement of the cover.

The teeth 20 and steps 70 along with a lip 85 and groove 87 arrangement (FIG. 19) are used with the end faces 30, 32 to prevent barbs E from slipping through the gap between the halves, which could happen if the hooks rotate while captured by the teeth. If the barb is sticking out of the end face when the user tries to close the device it will prevent the device from closing and will remain opened, thus alerting the user of the issue.

Drain holes 77 are provided in various locations in the cover. The drain holes on the cover allow water to drain from the cover after rinsing or cleaning.

End hooks 80 of the cover are provided at opposite ends of the cover for allowing the cover to be attached to many things for transport or storage. These include but are not limited to eyes/guides on fishing poles, nails or hooks, cable railings, loops of fabric or strapping, horizontal rods, etc. Attaching the cover to a guide on a fishing pole and tightening the line allows the cover with a lure attached to be stored in a similar way as lures are typically stored now. The end hooks 80 also allow daisy chaining multiple covers together for transport or storage.

Figure 13:
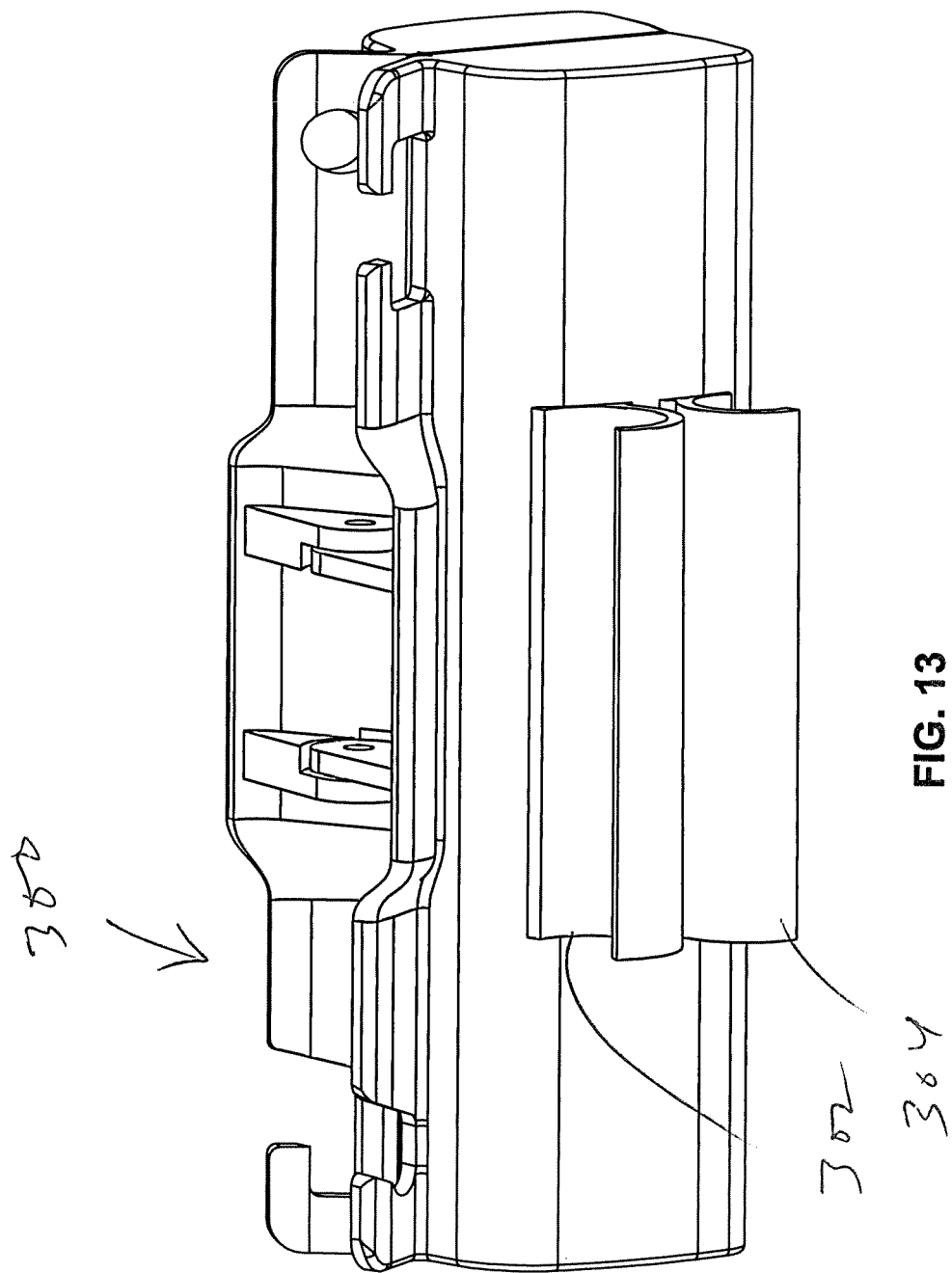
FIG. 13 is a rear perspective view of the cover in accordance with another aspect of the disclosure.
Figure 14:
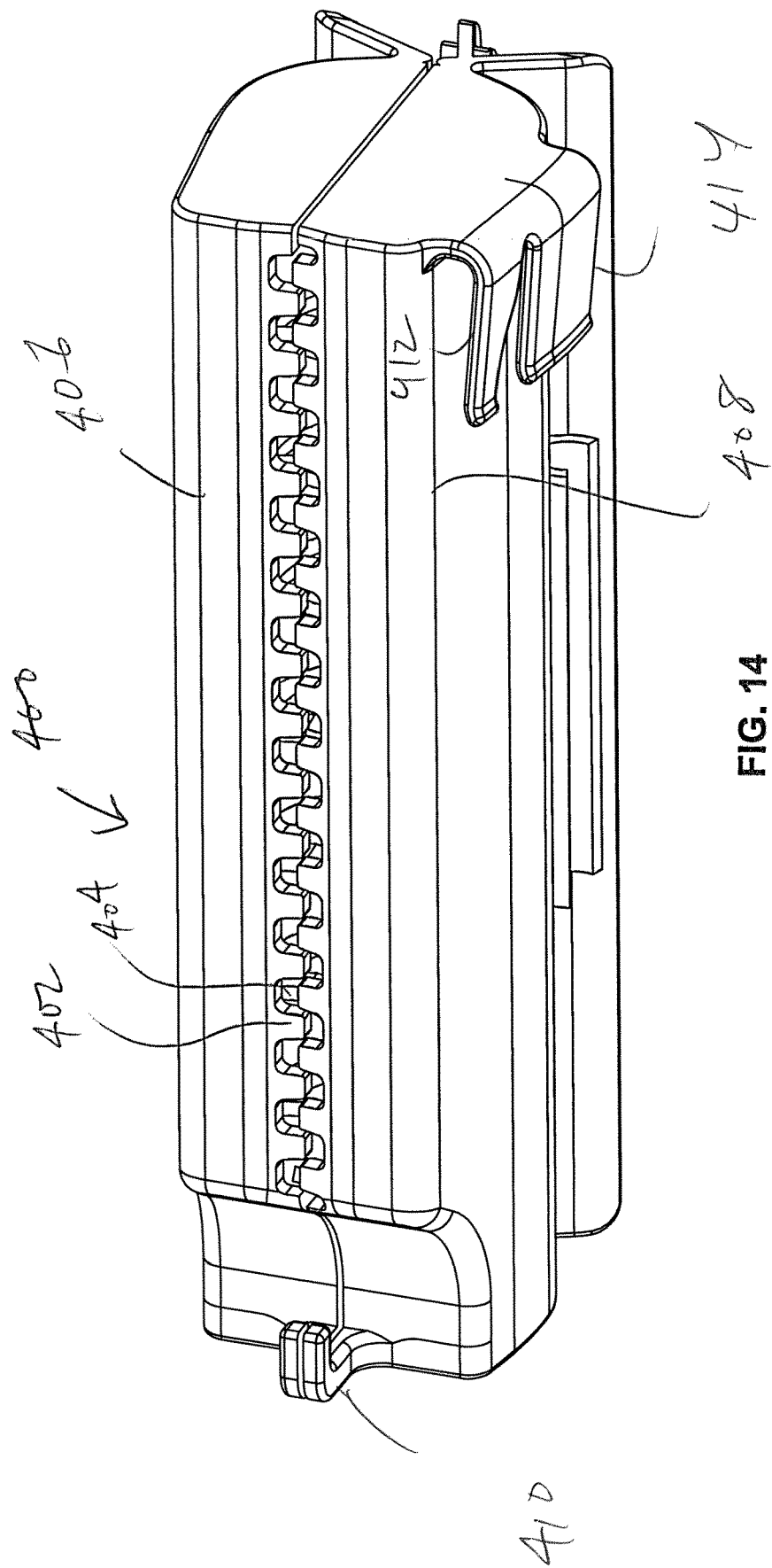
FIG. 14 is a front perspective view of the cover in accordance with another aspect of the disclosure.

The end hooks 80 are preferably formed of two halves 82, 84 which each form half of the lateral dimension or thickness of the hook. The two halves 82, 84 together form a stronger hook than a single half and when they are attached to a fishing pole line or a guide, they are prevented from opening fully by the guide that they are attached to. Alternate style hooks can also be used to attach to either the fish pole or other objects such as shown in FIGS. 13 and 14.

Figure 8:
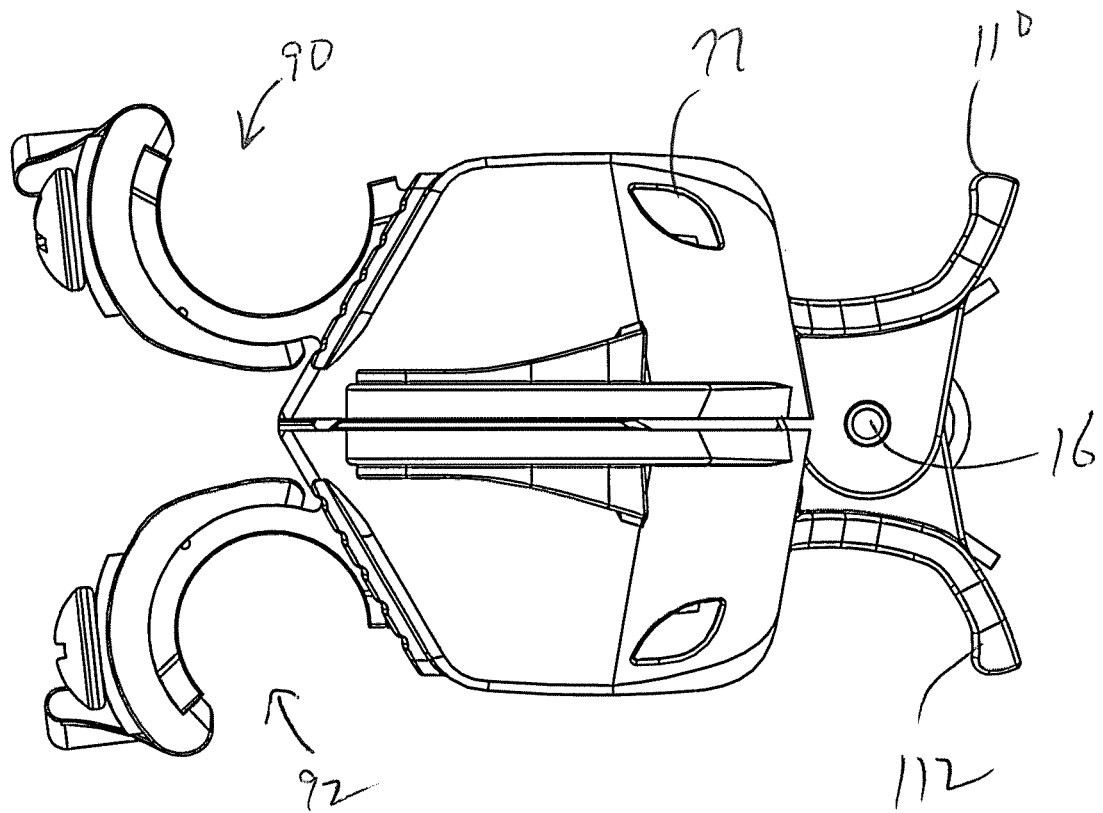
FIG. 8 is a side elevational view of the cover of FIG. 3 in a closed configuration.
Figure 10:
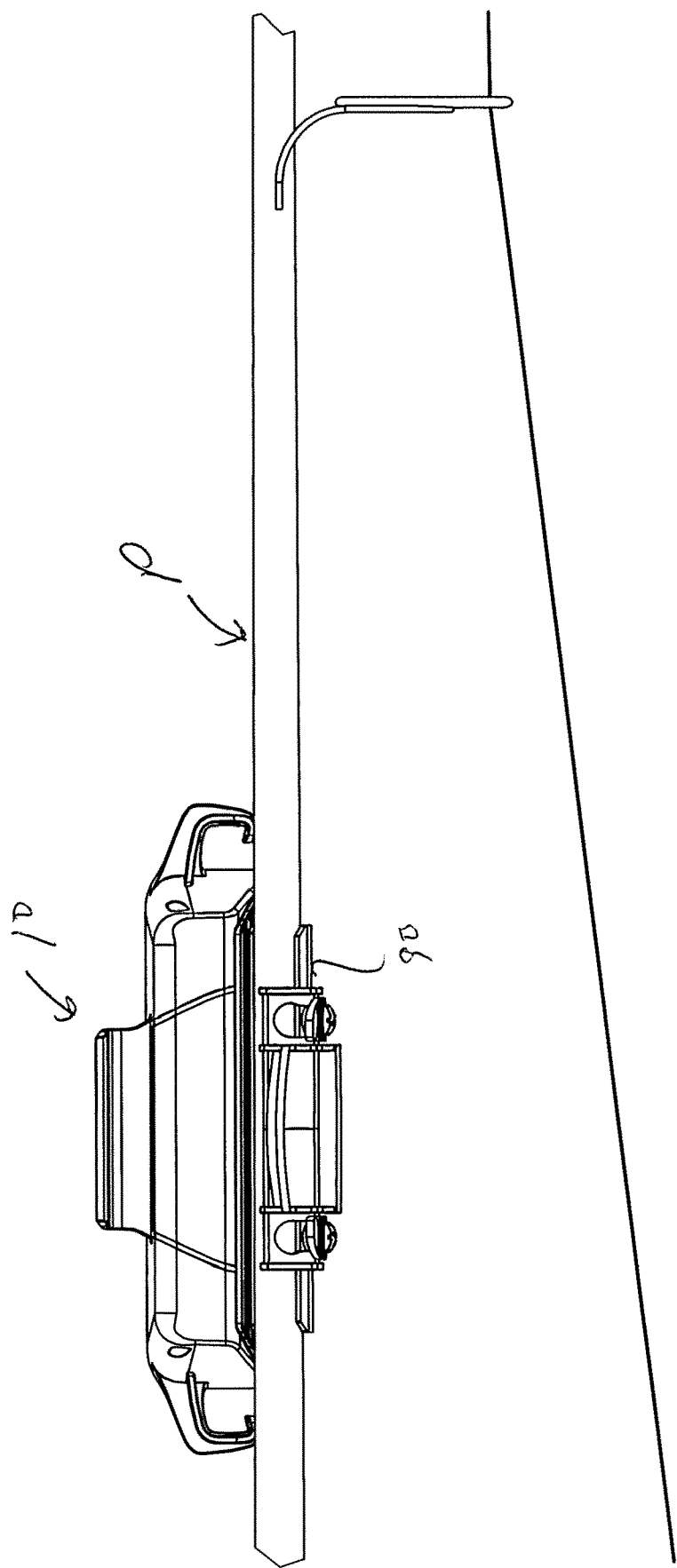
FIG. 10 is a side elevational view of the cover of FIG. 3 with a fishing rod attached.
Figure 11:
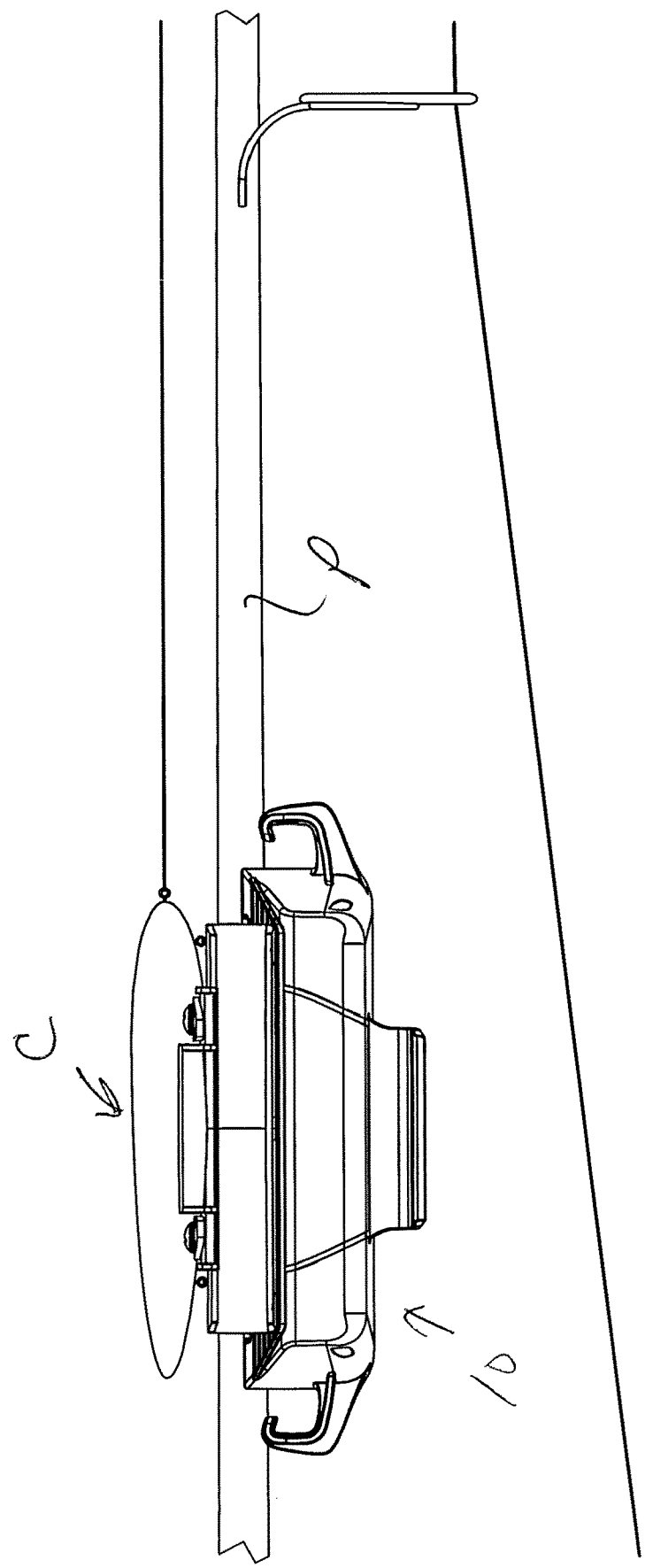
FIG. 11 is a side elevational view of the cover of FIG. 3 with a fishing lure and fishing rod attached.

Referring now to FIGS. 8 and 10, tapered clips 90, 92 in the form of substantially c-shaped clips are provided to allow the cover to be attached to a fishing pole and to a lure C (see FIG. 11)

The clips 90, 92 have some flexibility to allow a tight or snug fit with the pole body. Since fishing poles are typically tapered, a straight clip would only be able to connect with a portion of the pole and would not provide a secure fit. The clips 90, 92 are tapered to match or be very close to matching the taper in the fishing pole body. Referring to FIGS. 10 and 11, the user can push the clip 90, 92 over the fishing pole diameter where the diameter is smaller, then the clip slides down the fishing pole to a larger diameter portion of the pole which then wedges the clip to the pole and creates a tight fit. That is, the fit is tight enough that if a lure is attached to a line it is held by the cover, then the line can be tightened enough to take up slack and secure it into place without the clip becoming loose. This arrangement still allows the cover to rotate around the rod without loosening.

Referring to FIG. 8, mirrored tapered clips 90, 92 are provided. Since a taper would occur in a certain direction, a simple tapered clip would necessitate the user placing the hook on a certain orientation while may not always happen. Thus, to eliminate user error, the tapered clip is mirrored about the narrow end so it can be placed on the rod in any orientation. This creates an hourglass or butterfly shaped clip, that is, the bottom section of the clip will be fully engaged with the pole, with the top section flaring away from the pole.

Figure 17:
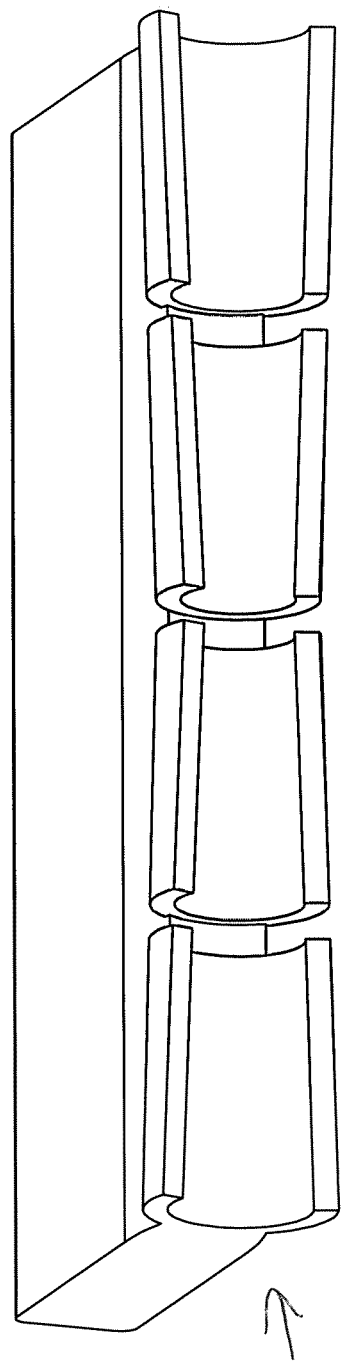
FIG. 17 is a perspective view of a tapered clip with portions removed in accordance with another aspect of the disclosure.

In FIG. 17, an exaggerated taper angle of the clips 90,92 is shown to make it visible, as the actual taper is quite slight (i.e. about 0.2 degrees). The tapered clip also does not need to be fully contiguous to function; that is, gaps can be formed along its length. While the gaps would eliminate material, they also allow each clip section to flex independently which can help fit poles which have a taper that deviates from the taper of the clip. This allows a part of the upper section to be engaged.

Portions of the clip 90, 92 may be removed so long as they still allow the remaining portions to oppose one another and grip. The clips may be available in multiple sizes to accommodate different poles. In the present disclosure the arrangement is two different sized clips in the same cover assembly to accommodate a wide range of poles. Differently sized clips can be color coded or marked in other ways for quick identification. Ideally the clips will be sized to fit on a rod between the reel and the first fishing line guide or loop guide, which makes it easy for the user to access the lure cover. On most poles the fishing line is further from the pole since it is coming from the reel, which makes it less likely to interfere with the cover. The cover can be attached to segments elsewhere on the pole.

The clips 90, 92 are located on the same side as the teeth 20 to avoid confusion with similar looking L-shaped squeeze tabs 110, 112 (see FIG. 3) which are located on opposite sides of the cover pressed together by the users user's fingers using one hand about a spring biased hinge 114 to open the cover and separate the two cover halves 12, 14. Both squeeze tabs and the clips are located to conserve space to minimize the overall size of the cover.

Figure 3:
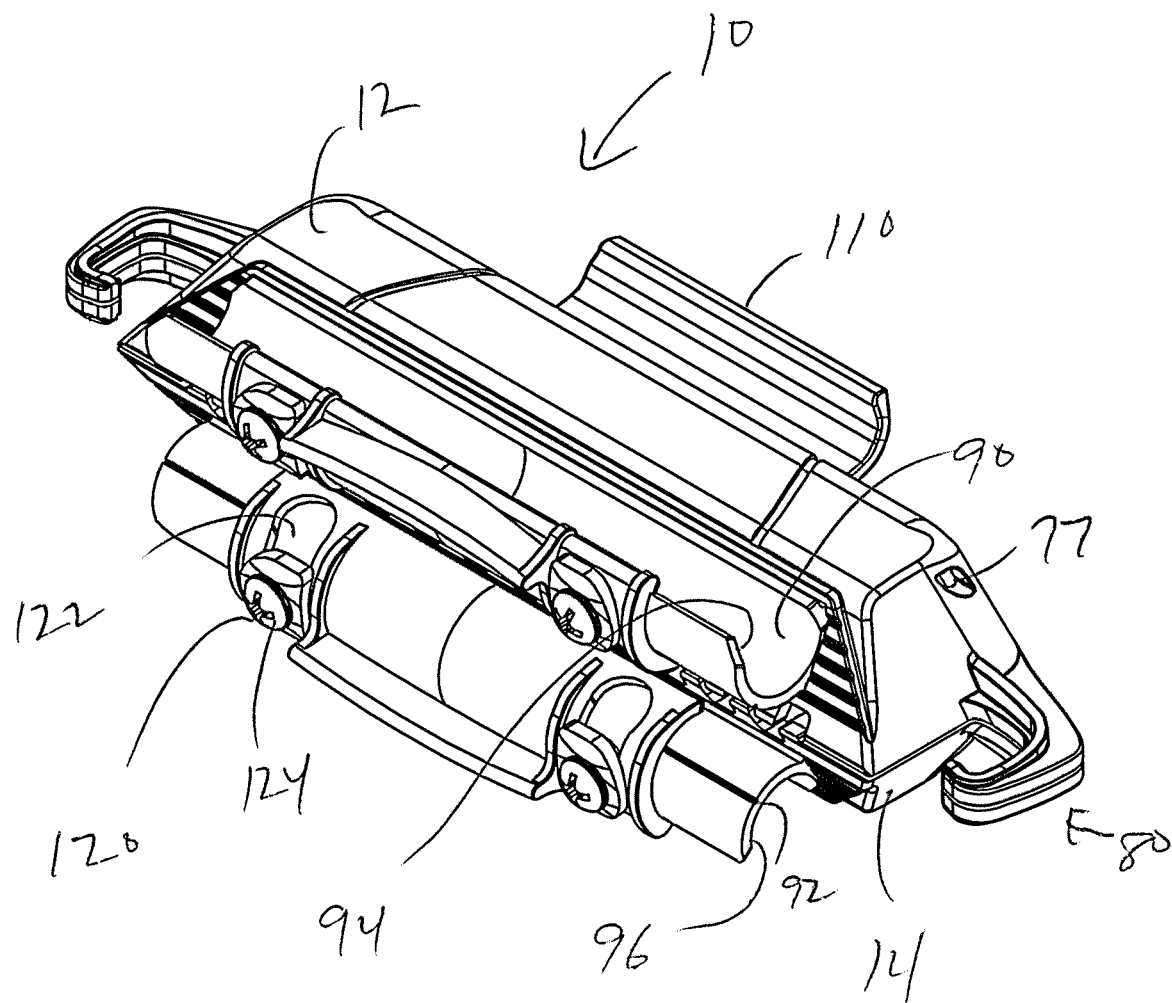
FIG. 3 is a perspective view of a cover for fishing lure hooks in a closed configuration in accordance with a first embodiment of the disclosure.

Referring now to FIG. 3, once the cover is attached to the pole, a rotating lock mechanism 120 is used to further secure the cover to the pole. The lock mechanism includes a groove 122 and a screw or tab 124 which is tightened and loosened to further secure or release the cover from the pole. With the tapered clips 90,92 if the pole is slid along the clips it could become loose as the diameter of the pole gets smaller. The lock mechanism helps prevent the cover from becoming loose from the pole. Lines on the clip indicate when the cover is in the fully locked position.

The lock prevents accidental opening of the cover or accidentally pressing the squeeze tabs 110, 112 and opening the cover.

The tapered clips 90, 92 may have rubber added to them to further secure the rod to the clips by increasing sliding friction to oppose removal of the clip from the fishing rod, from large diameter rods to small diameter rods. The rubber could be added in a ring, dot, line or pattern along the length.

Figure 12:
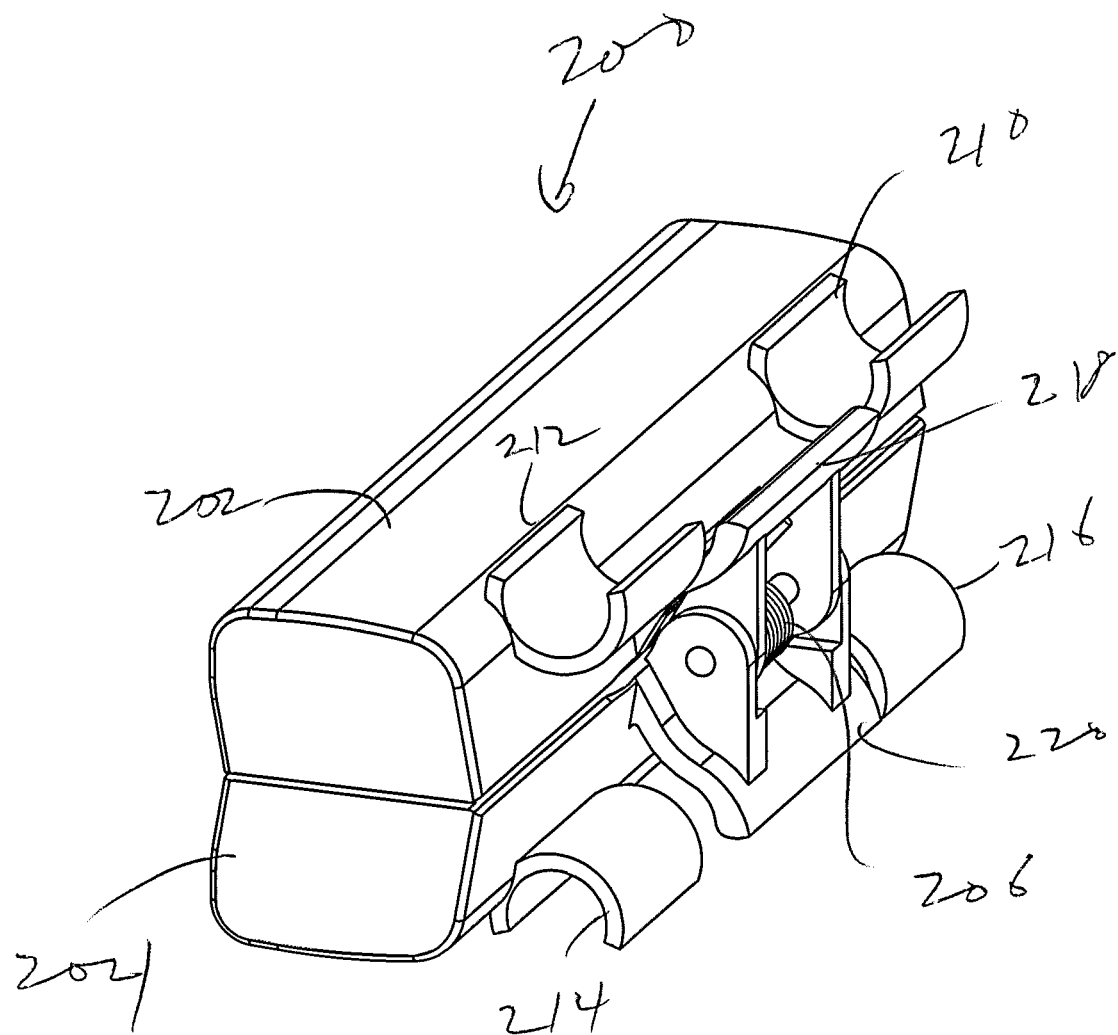
FIG. 12 is a perspective view of a cover for fishing lure hooks in a closed configuration in accordance with a second embodiment of the disclosure.

Referring to FIG. 12, an alternate fish lure hook cover 200 is shown. The cover has two halves 202, 204 connected by a spring hinge 206. Clips 210, 212,214, 216, are formed on the same side as the hinge to connect the cover to the fish pole. Squeeze tabs 218, 220 are formed on opposite sides of the hinge 206 to inwardly push the halves open.

FIG. 13 shows a cover 300 which has tapered clips 302, 304 found in the middle of the cover tube.

FIG. 14 shows a cover 400 which has teeth 402 and gap 404 formed in each cover half 406, 408. Various clips 410, 412, 414 are found on different portions of the cover to secure the cover to a variety of objects, such as fishing poles, clothing, etc.

Figure 15:
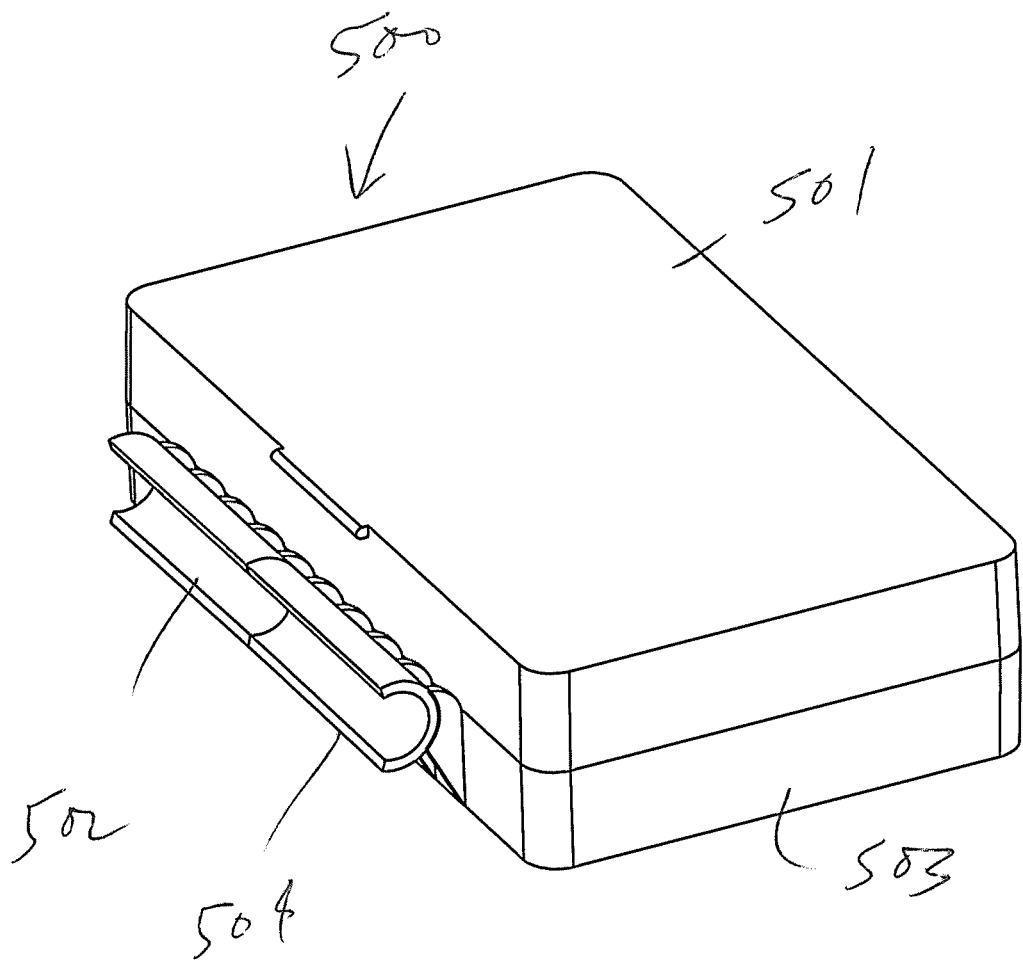
FIG. 15 is a perspective view of a tackle box in a closed configuration in accordance with another embodiment of the disclosure.
Figure 16:
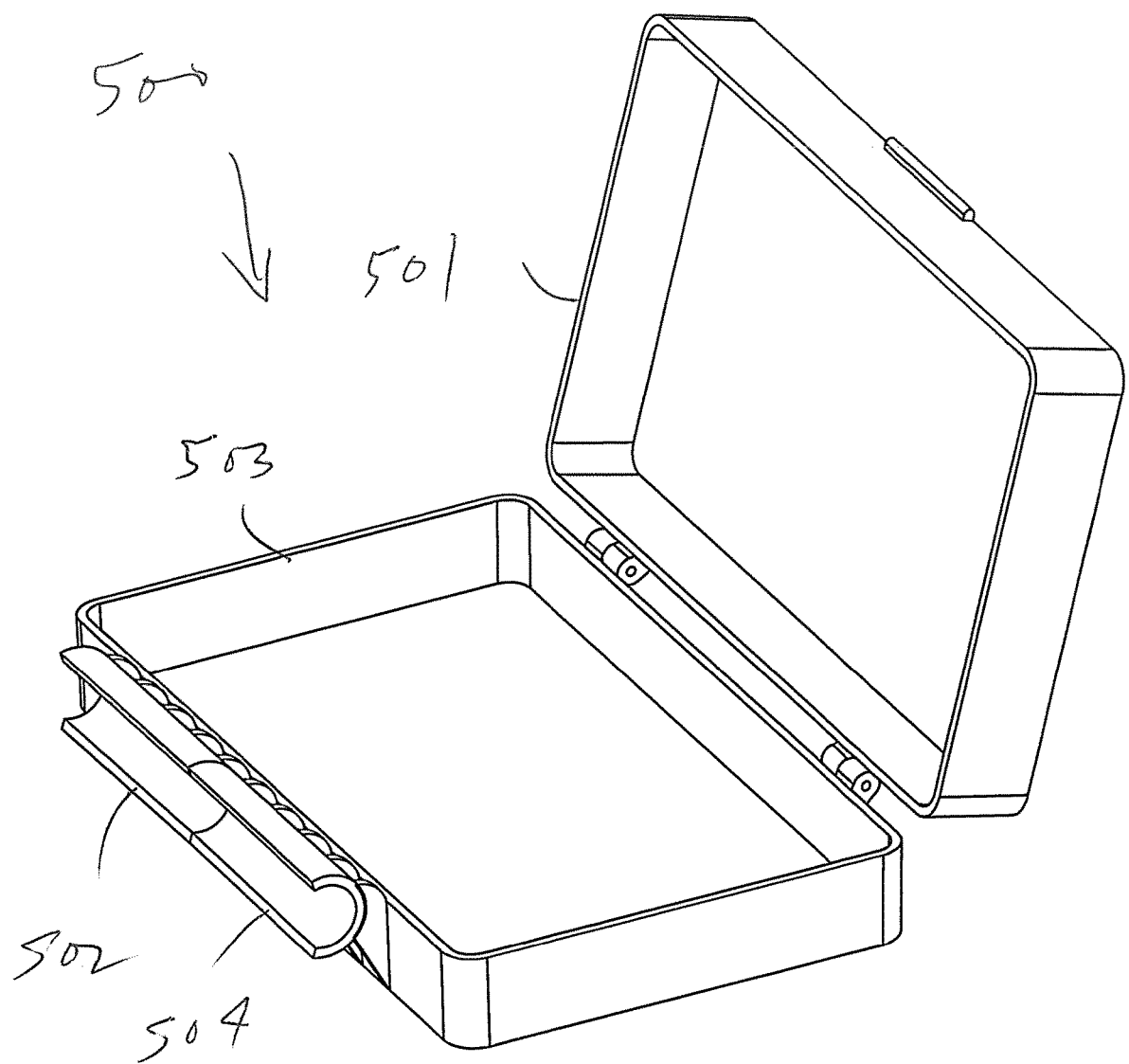
FIG. 16 is a perspective view of the tackle box of FIG. 15 in an opened configuration.

Referring now to FIGS. 15 and 16, a tackle box 500 having an upper body 501 and a lower body 503 can be added to a fish pole. The box would also have tapered clips 502, 504, to secure the box to the fish pole. The box can accommodate various fishing accessories.

Buoyant objects in different placements, shapes and sizes can be added to the cover to allow it to float if it falls in the water. These can be permanently attached or removable. Carabiners can be added on the hooks to allow daisy chaining of the multiple hooks as a convenient chain of protected lures enabling lure quick and easy selection.

The preferred embodiment has been described with respect to the embodiments. Obviously, modifications and alterations will occur to others upon a reading and understanding of the preceding detailed description. It is intended that the embodiments be construed as including all such modifications and alternatives in so far as they come within the scope of the appended claims or the equivalent thereof.

The invention claimed is:

1. A cover for fishing lures, comprising:
a body having a first half and a second half,
wherein said first half and said second half are connected together by a resilient biased hinge;
a plurality of teeth are formed on said first half and said second half on an opposite side of said first half and said second half from said resilient biased hinge; and said teeth are configured to retain stems of treble hooks of said lures within said cover;
wherein a gap is formed between each of said teeth;
wherein said first half and said second half each comprises a cavity for retaining one or more of said treble hooks of said fishing lure; and said first half and said second half each comprises sloped end faces to facilitate removal and avoiding piercing of said treble hook and said fishing lure.

2. The cover of claim 1 wherein said cover is made of rigid plastic of 75 shore D hardness/Durometer.

3. The cover of claim 1, wherein said teeth have angled edges of about 5 degrees.

4. The cover of claim 1, where internal dividers are formed within the cavities of said first half and said second half to prevent longitudinal and rotational movement of said treble hooks.

5. The cover of claim 4, wherein each of said internal dividers comprises a short portion and a long portion each perpendicular to a longitudinal axis of said cover.

6. The cover of claim 1, further comprising notches having ledges and back faces formed on inner walls of said first half and said second half, wherein said notches prevent the treble hooks from moving within the cover.

7. The cover of claim 1, further comprising drain holes formed on one or more corners to facilitate draining water from said cover.

8. The cover of claim 1, further comprising a pair of clips for attaching said cover to a fishing pole.

9. The cover of claim 8, wherein each of said clips is a substantially C-shaped elongated cylindrical member.

10. The cover of claim 8, wherein each of said clips is tapered toward a central portion of said clips from opposite ends to facilitate securing said cover to a fishing pole.

11. The cover of claim 1, further comprising a locking mechanism to secure said cover to a fishing pole.

12. A cover for hooks for fishing lures, comprising:
a body having a first half and a second half,
a plurality of teeth are formed on said first half and said second half,
wherein a gap is formed between each of said teeth;
wherein said first half and second half each comprises a cavity for retaining one or more associated hooks of a fishing lure;
wherein said first half and said second half each comprises sloped end faces to facilitate removal and avoiding piercing of said hooks and said fishing lure from the cover; and further comprising retaining hooks provided at opposite ends of said cover to attach said cover to a fishing pole.

13. A cover for a hook for a fishing lure, comprising:
a body having a first and a second half,
wherein said first half and said second half are connected together by a resilient biased hinge;
a plurality of teeth are formed on said first half and said second half;
wherein a gap is formed between each of said teeth;
wherein said first half and said second half each comprises a cavity for retaining one or more of said hooks of said fishing lure;
said first half and said second half each comprises sloped end faces to facilitate removal and avoiding piercing of said hooks and said fishing lure from the cover;
a locking mechanism to secure said cover to an associated fishing pole, wherein said locking mechanism comprises elongated slots and fasteners positioned within said slots so that said fasteners slid along said slots until said fasteners contact an edge of said slots and then secure said cover to said fishing pole.

14. A cover for fishing lures, comprising:
a body having a first half and a second half, connected together by a resilient biased hinge;
a plurality of teeth are formed on said first half and said second half;
wherein a gap is formed between each of said teeth;
wherein said first half and said second half each comprises a cavity for retaining a treble hook of a fishing lure and ribs-internal dividers for securing said treble hooks within said cover; and
elongated cylindrical c-shaped clips which are tapered toward a central portion of said clips from opposite ends of said clips such that an associated fishing pole is retained with said clips.

15. The cover of claim 14, further comprising retaining hooks provided at opposite ends of said cover to attach said cover to a fishing pole.

16. The cover of claim 14, further comprising a locking mechanism to secure said cover to a fishing pole.

17. The cover of claim 16, wherein said locking mechanism comprises elongated slots and fasteners wherein said fasteners are slid along said elongated slot and then tightened to secure said cover to a fishing pole.

* * * * *